(12) United States Patent
Chen et al.

(10) Patent No.: US 8,830,647 B2
(45) Date of Patent: Sep. 9, 2014

(54) FAULT CURRENT LIMITER

(75) Inventors: Song Chen, Malden, MA (US); Peng Li, Marlborough, MA (US); Bradley Lehman, Belmont, MA (US); Gianfranco de Palma, Arlington, MA (US)

(73) Assignees: Mersen USA Newburyport-MA, LLC, Newburyport, MA (US); Northeastern University, Boston, MA (US)

( * ) Notice: Subject to any disclaimer, the term of this patent is extended or adjusted under 35 U.S.C. 154(b) by 288 days.

(21) Appl. No.: 13/479,660

(22) Filed: May 24, 2012

(65) Prior Publication Data

US 2013/0314828 A1      Nov. 28, 2013

(51) Int. Cl.
*H02H 9/08* (2006.01)
*H02H 3/00* (2006.01)
H02H 7/00 (2006.01)

(52) U.S. Cl.
USPC .............................. 361/93.9; 361/13; 361/63

(58) Field of Classification Search
CPC .......... H02H 9/02; H02H 9/021; H02H 9/023
USPC ............................................ 361/93.9, 63, 13
See application file for complete search history.

(56) References Cited

U.S. PATENT DOCUMENTS

| 4,525,669 | A | 6/1985 | Holberton et al. | 324/142 |
| 4,525,765 | A | 6/1985 | Brajder | 361/88 |
| 5,414,586 | A | 5/1995 | Hara et al. | 361/19 |
| 6,204,751 | B1 | 3/2001 | Bolda et al. | 340/268.02 |
| 6,268,754 | B1 | 7/2001 | Sakuma et al. | 327/283 |
| 8,035,938 | B2 * | 10/2011 | Divan | 361/58 |
| 2003/0086231 | A1 | 5/2003 | Asaeda et al. | 361/93.9 |
| 2003/0160517 | A1 | 8/2003 | Lo et al. | 307/140 |

OTHER PUBLICATIONS

Hagh et al., "Nonsuperconducting Fault Current Limiter with Controlling the Magnitudes of Fault Currents," IEEE Transactions on Power Electronics, vol. 24, No. 3, Mar. 2009, pp. 613-619.

Hosseini et al., "Power loss and Ripple Current Analysis of a DC Reactor Type Fault Current Limiter," Australian Journal of Basic and Applied Sciences, 5(5): pp. 448-454, 2011, ISSN 1991-8178.

(Continued)

*Primary Examiner* — Dharti Patel
(74) *Attorney, Agent, or Firm* — Kusner & Jaffe

(57) ABSTRACT

A fault current limiter (FCL) for limiting a fault current in a power line during a fault condition. The FCL includes a magnetic coupling circuit for monitoring current in the power line through magnetic coupling; a sensing circuit for sensing the current in the power line and providing a signal indicative of the sensed current; a control circuit receiving the signal indicative of the sensed current in the power line and determining whether the sensed current indicates that the fault condition exists; and high and low impedance paths that are connected in parallel. The high impedance path includes a discharging impedance circuit for limiting the fault current. The low impedance path includes a reactor circuit and a switching unit having an ON state for conducting current through the low impedance path and an OFF state for conducting current through the high impedance path.

26 Claims, 7 Drawing Sheets

(56) References Cited

OTHER PUBLICATIONS

Charmin et al., "Non-Superconducting Fault Current Limiter," Proceedings of the 5$^{th}$ WSEAS International Conference on Applications of Electrical Engineering, Prague, Czech Republic, Mar. 12-14, 2006, pp. 12-17.

Hosseini et al., "Novel Type of Fault Current Limiter," Australian Journal of Basic and Applied Sciences, 5(5): pp. 441-447, 2011, ISSN 1991-8178.

Noe et al., "High-temperature superconductor fault current limiters: concepts, applications, and development status," Institute of Physics Publishing, Superconductor Science and Technology, Supercond. Sci. Technol. 20 (2007), pp. R15-R26. doi: 10.1088/0953-2048/20/3/R01.

"Superconducting Fault Current Limiters," Technology Watch 2009, 1017793, EPRI, Electric Power Research Institute, pp. 2-5, 2-6.

* cited by examiner

FAULT CURRENT LIMITER

FIELD OF THE INVENTION

The present invention relates generally to fault current limiters, and more particularly to a non-superconducting fault current limiter.

BACKGROUND OF THE INVENTION

As the demand for electric power increases, new power sources (such as Independent Power Producers (IPPs) and Distributed Generators (DGs)) are being added to the power grid. The consequence of this trend is that the fault current in the power system is being increased, exceeding the ratings of existing protection devices, e.g., circuit breakers, relays and fuses.

The IPPs, installed in parallel with existing generators, decrease the equivalent source impedance of the grid. Furthermore, the DGs are usually placed close to the load and the fault. Therefore, the impedance from the DGs to fault is also decreased. The effect of smaller impedance in the network is that the fault current might rise above the rated limits of the existing protection devices. In order to protect equipment (e.g., transformers and electric machines) it becomes necessary to either upgrade the protection devices or lower the threshold fault current level. However, device upgrade is generally not economically viable, considering the enormous number of devices that need replacement. Accordingly, fault current limiters (FCLs) have become a preferred option to address the over-rating issue.

Fault current limiter technology offers several advantages, including, but not limited to, the following: (i) mitigating the effect of high threshold fault current levels on a distribution system, thereby permitting use of lower rated protection devices and deferring costly device replacements; (ii) protecting existing devices from the first large peak during a fault condition, since many FCLs can limit the fault current within the first quarter-cycle; (iii) reducing voltage dips; and (iv) enhancing grid stability.

Traditionally, FCLs have been applied in power generation, transmission and distribution, and in all ranges of voltage levels from 400V to 132 kV. Typical applications of FCLs include busbar coupling and transformer feeder, distributed generation coupling, power plant auxiliaries, and ship propulsion systems.

An FCL ideally possesses the following characteristics: (a) virtually zero impedance under normal operation; (b) fast detection and fast action (e.g., detection of fault current within the first cycle); (c) minimum impact on existing protection relays and circuit breakers; (d) minimum impact on voltage magnitude and phase; and (e) automatic and fast recovery to address repeated faults.

Examples of existing FCL technologies include Superconductor FCL (SCFCL), Solid-State FCL (SSFCL), and Is-limiter. Each of these existing FCL technologies has drawbacks (e.g., high operation losses, bulky size and servicing/part replacement issues). Most SSFCLs and some SCFCLs are subjected to switching losses during normal operation. Moreover, the superconductors in SCFCLs require extra energy to be cryogenized in order to stay in the superconducting state during normal operation. Many FCLs mentioned above are large in dimensions. They either need extra cryogenic equipments, or need large capacitor banks or large iron cores to operate. An Is-limiter is comprised of an extremely fast switch, paralleled with a high rupturing capacity fuse. In order to achieve the desired short opening time, the Is-limiter fires a pyrotechnic charge to open the main conductor. The fault current is then carried by the parallel fuse, which interrupts the fault current at the next zero crossing. The Is-limiter has several drawbacks. For example, the Is-limiter can raise safety concerns because it is not fail-safe, that is, correct operation of the Is-limiter cannot be tested without destroying the Is-limiter (i.e., the parallel fuse). Furthermore, supply of pyrotechnic materials are regulated and constrained by the U.S. Department of Defense, thereby resulting in supply problems and increased manufacturing costs. In addition, replacement of the parallel fuse is required after each triggering, thus leading to high operating cost.

One existing Non-Superconducting FCL (NSCFCL) is a bridge-type non-superconducting FCL proposed by M. T. Hagh and M. Abapour in "Nonsuperconducting Fault Current Limiter With Controlling the Magnitudes of Fault Currents;" Hagh, M. T. and Abapour M.; IEEE TRANSACTIONS ON POWER ELECTRONICS; 2009; Vol. 24; No. 3; pp. 613-619, hereinafter referred to as "Hagh et al." In Hagh et al.'s NSCFCL, a DC reactor serves two functions: (a) during normal operation, the DC reactor minimizes the current ripple of the rectified DC current; and (b) during a fault condition, the DC reactor is used as impedance during the initial rise of fault current. The rise of the fault current is slowed so that a control circuit has adequate time to operate a semiconductor switch. This NSCFCL has drawbacks that include, but are not limited to: (1) the need for a semiconductor switching unit having a high voltage rating due to the high voltage stress; (2) the need for a discharging resistor having a large resistance; (3) the need for isolation transformers having high voltage ratings; and (4) large DC reactor size with current always through it in either the normal or faulted state. These component requirements result in high manufacturing costs for the NSCFCL.

The present invention provides a non-superconducting fault current limiter that overcomes these and other drawbacks of existing FCLs.

SUMMARY OF THE INVENTION

In accordance with one aspect of the present invention, there is provided a fault current limiter (FCL) for limiting a fault current in a power line during a fault condition. The FCL comprises: (a) a magnetic coupling circuit for monitoring current in the power line through magnetic coupling; (b) a sensing circuit for sensing the current in the power line and providing a signal indicative of the sensed current; (c) a control circuit receiving the signal indicative of the sensed current in the power line and determining whether the sensed current indicates that the fault condition exists; and (d) high and low impedance paths connected in parallel. The high impedance path includes a discharging impedance circuit for limiting the fault current, wherein the discharging impedance circuit injects a discharging impedance into the main power line through magnetic coupling during the fault condition. The low impedance path includes (i) a reactor circuit; and (ii) a switching unit having an ON state and an OFF state, wherein the state of the switching unit determines whether current conducts through the low impedance path or the high impedance path. The control circuit determines the state of the switching unit.

In accordance with another aspect of the present invention, there is provided a power system comprising: (a) a power line that electrically connects a power source to a load; (b) a protection device for interrupting a circuit to clear a fault condition; and (c) a fault current limiter (FCL) for limiting a fault current in the power line during a fault condition. The FCL comprises: (i) a magnetic coupling circuit for monitoring current in the power line through magnetic coupling; (ii) a sensing circuit for sensing the current in the power line and providing a signal indicative of the sensed current; (iii) a control circuit receiving the signal indicative of the sensed current in the power line and determining whether the sensed current indicates that the fault condition exists; and (iv) a high impedance path. The high impedance path includes a discharging impedance circuit for limiting a fault current during a fault condition. The discharging impedance circuit injects a discharging impedance into the main power line through magnetic coupling during the fault condition.

In accordance with still another aspect of the present invention, there is provided a method for limiting a fault current in a power line. The method includes the steps of (a) monitoring current in the power line through magnetic coupling; (b) sensing the current in the power line; (c) determining whether the sensed current indicates that a fault condition exists; and (d) redirecting current to a high impedance path if the fault condition is determined to exist, thereby limiting the fault current in the power line during the fault condition.

An advantage of the present invention is the provision of an FCL that is more compact and lighter weight than existing FCLs.

Another advantage of the present invention is the provision of an FCL that requires fewer components.

Still another advantage of the present invention is the provision of an FCL that is less expensive to manufacture.

Still another advantage of the present invention is the provision of an FCL that is more reliable.

Still another advantage of the present invention is the provision of an FCL that has a low normal operation loss.

Still another advantage of the present invention is the provision of an FCL that does not require service or replacement after triggering.

Yet another advantage of the present invention is the provision of an FCL that limits a fault current to a predefined level.

These and other advantages will become apparent from the following description taken together with the accompanying drawings and the appended claims.

BRIEF DESCRIPTION OF THE DRAWINGS

The invention may take physical form in certain parts and arrangement of parts, an embodiment of which will be described in detail in the specification and illustrated in the accompanying drawings which form a part hereof, and wherein.

DETAILED DESCRIPTION OF THE INVENTION

Figure 1:
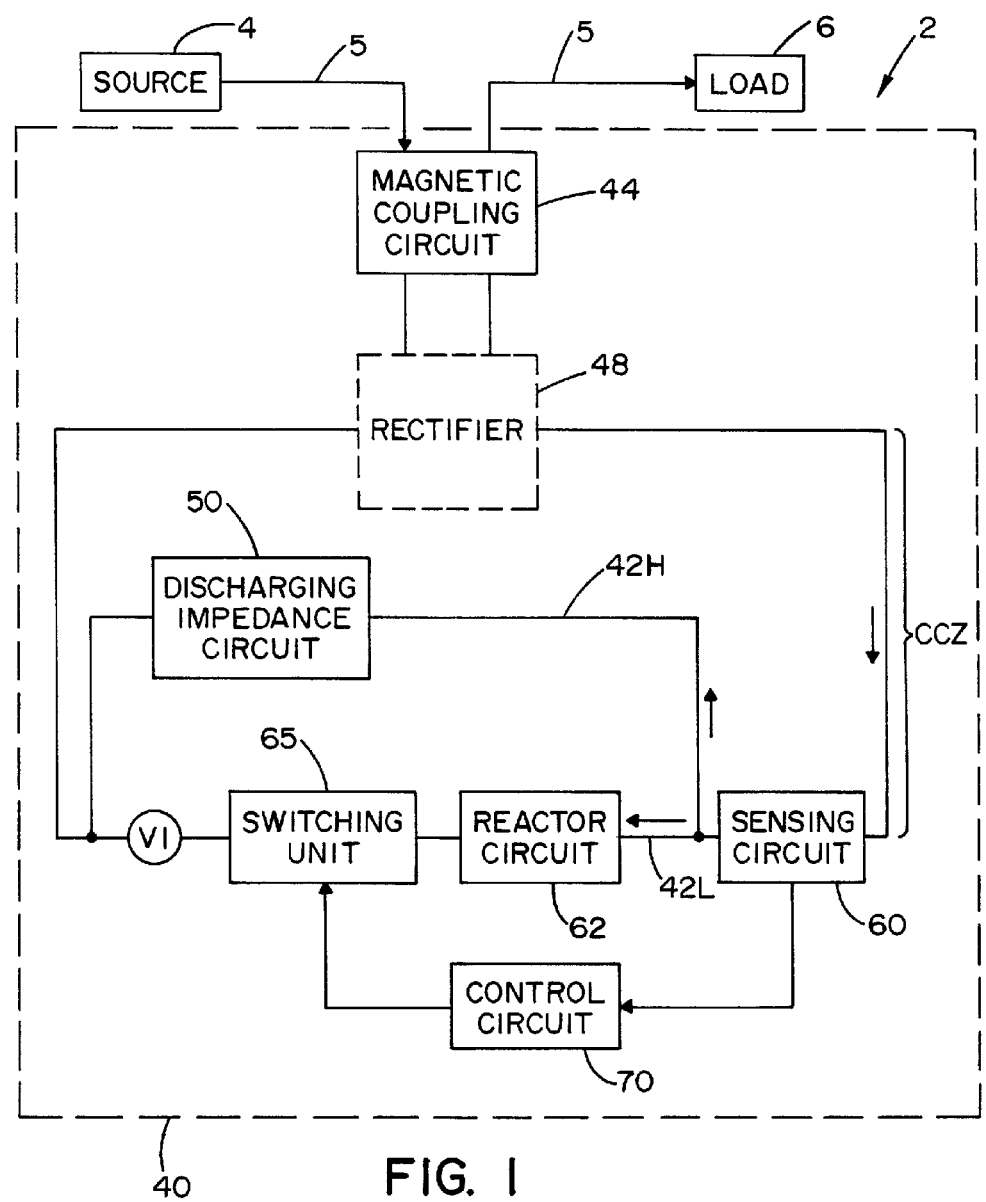
FIG. 1 is a schematic diagram showing a power system that includes an FCL according to an embodiment of the present invention.

Referring now to the drawings wherein the showings are for the purposes of illustrating an embodiment of the invention only and not for the purposes of limiting same, FIG. 1 shows a power system 2 that includes a power line 5 that electrically connects a power source 4 to a load 6. Power line 5 is comprised of one or more individual conductors. System 2 also includes a fault current limiter (FCL) 40 according to an embodiment of the present invention. Power source 4 may take the form of an AC or DC power source, including, but not limited to, a single-phase AC generator or utility grid, a 3-phase AC generator or utility grid, or a DC generator system or power source, such as photovoltaic arrays and batteries. In the embodiment shown in FIG. 1, power source 4 is an AC power source.

FCL 40 is generally comprised of a magnetic coupling circuit 44; a sensing circuit 60; a control circuit 70; a low impedance path 42L including a reactor circuit 62, a switching unit 65, and a DC source V1 (voltage or current source); and a high impedance path 42H including a discharging impedance circuit 50. Low impedance path 42L is connected in parallel with high impedance path 42H. Since power source 4 shown in FIG. 1 is an AC power source, FCL 40 also includes a rectifier 48. Rectifier 48 is included in order to convert AC current on power line 5 to DC current. If power source 4 is a DC power source, then rectifier 48 is omitted.

There are three principal operating zones of power system 2, namely, power line 5, current central zone (CCZ), and sensing circuit 60/control circuit 70. As indicated above, power line 5 connects power source 4 to load 6. Power line 5 is where a fault occurs and is the object of protection. The CCZ is coupled to power line 5 through magnetic coupling circuit 44, and has a current that corresponds to the current of power line 5.

Magnetic coupling circuit 44, which typically takes the form of an isolation transformer comprised of one or more current transformers, provides current coupling between power line 5 and the CCZ of FCL 40. Each current transformer is comprised of inductors (primary and secondary) that are magnetically coupled (e.g., a pair of iron core mutual inductors). The primary inductor of magnetic coupling circuit 44 is in series with power line 5. The secondary inductor of magnetic coupling circuit 44 is electrically connected with the CCZ. The current in power line 5, during both normal and fault conditions, is monitored using magnetic coupling circuit 44, as will be explained in further detail below. As indicated above, rectifier 48 is included when power source 4 is an AC power source in order to convert AC current on power line 5 to DC current. If power source 4 is DC, then rectifier 48 is not required.

Sensing circuit 60 may include any suitable current sensing device (e.g. a Hall-effect sensor or a shunt resistor). Sensing circuit 60 monitors the current in power line 5 and provides a signal to control circuit 70 indicative of the sensed current level. It should be appreciated that current sensing can be performed at various locations, including, but not limited, the CCZ as shown in FIG. 1, at power line 5, and at the current transformers of magnetic coupling circuit 44. Accuracy may be improved by using sensing circuit 60 to monitor the current directly at power line 5, when inductors of magnetic coupling circuit 44 are weakly coupled during normal conditions.

As discussed above, FCL 40 comprises low impedance path 42L and high impedance path 42H. Low impedance path 42L includes reactor circuit 62, switching unit 65 and DC source V1. High impedance path 42H includes discharging impedance circuit 50. During normal operation, current conducts through low impedance path 42L, whereas during a fault condition, current conducts through high impedance path 42H. Switching unit 65, operated by control unit 70, switches the current flow between low impedance path 42L and high impedance path 42H, as will be described in detail below.

Reactor circuit 62 includes a DC reactor that minimizes the current ripple of the rectified DC current during normal operation. When a fault occurs, the DC reactor provides impedance during the initial rise of fault current. In this respect, the DC reactor functions to slow down the fault current, thereby providing time for control circuit 70 to activate switching unit 65. DC source V1 provides a DC bias during normal operation.

Switching unit 65 takes the form of a controllable switch, such as a semiconductor switch or a mechanical switch. Switching unit 65 has an ON state (open switch) and an OFF state (closed switch), wherein the state of switching unit 65 determines whether current conducts through low impedance path 42L or high impedance path 42H. In the illustrated embodiment, switching unit is in an ON state (closed switch) during normal operation and is in an OFF state (open switch) for a fault condition. Control circuit 70 receives the signal from sensing circuit 60 that is indicative of the sensed current level. When control circuit 70 determines that a fault condition exists, control circuit 70 activates switching unit 65 causing switching unit 65 to quickly change from the ON state (closed switch) to the OFF state (open switch), thereby redirecting fault current to the high impedance path 42H that includes discharging impedance circuit 50, which is described below.

Control circuit 70 may take various forms, including, but not limited to, an analog control logic circuit (e.g., a comparator circuit) or a programmable controller (e.g., a microcontroller unit). As indicated above, control circuit 70 determines whether there is a fault condition. In this respect, control circuit 70 receives the signal provided by sensing circuit 60, and uses this signal to determine whether the sensed current level is indicative of a fault condition. In the illustrated embodiment, control circuit 70 determines whether a fault condition exists by determining if the current in power line 5 exceeds a predetermined threshold fault current level. If it is determined that a fault condition exists, then control circuit 70 activates switching unit 65 to change the state of switching unit 65, thereby causing fault current to be redirected to discharging impedance circuit 50. In the illustrated embodiment, control unit 70 maintains switching unit 65 in the ON state (closed switch) during normal operation and switches switching unit 65 to the OFF state (open switch) in the event of a fault condition.

Referring now to high impedance path 42H, discharging impedance circuit 50 can be resistive, reactive, or any appropriate combination. When fault current is redirected to discharging impedance circuit 50, fault energy is consumed in order to limit fault current in the CCZ and on power line 5. Discharging impedance circuit 50 may take the form of combinations of RLC branches so that when impedance is inserted to power line 5 through magnetic coupling, it changes the time constant on power line 5 and slows down the rise of fault current. This may permit the magnetic coupling to last for a longer time period and limit the fault current until a secondary protection device is triggered and clears the fault.

During a fault condition, the sudden change of current in the primary inductor of magnetic coupling circuit 44 (which is in series with power line 5) inducts change in the magnetic field coupling the primary and secondary inductors of magnetic coupling circuit 44. In this transient, the fault current on power line 5 is reflected to the secondary inductor of magnetic coupling circuit 44, and thus to the CCZ. As soon as the current monitored by sensing circuit 60 reaches the threshold fault current level, control circuit 70 outputs a trigger signal to the switching unit 65, thereby causing switching unit to switch from the ON state (closed switch) to the OFF state (open switch). As a result, low impedance path 42L is disconnected, and fault current is redirected from low impedance path 42L to high impedance path 42H which includes discharging impedance circuit 50.

Figure 2A:
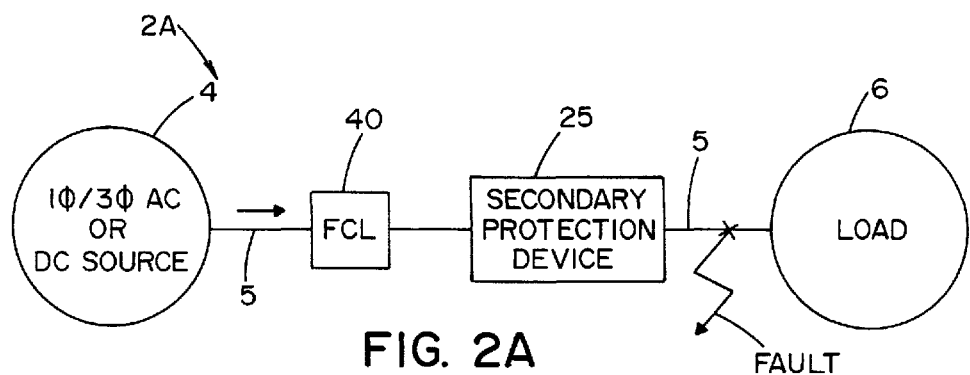
FIG. 2A is a block diagram showing a power system that includes the FCL of the present invention in series with a secondary protection device.

It is contemplated that the present invention may also be used in conjunction with a secondary protection device (e.g., fuses, circuit breakers, protective relays, and other circuit interrupting devices). FIG. 2A is a block diagram showing a power system 2A that includes FCL 40, as described above in connection with FIG. 1, and a secondary protection device 25. Advantageously, the size, weight and component costs for FCL 40 can be reduced when FCL 40 is used in conjunction with a secondary protection device that clears the fault condition within a transient time (e.g., 50 ms-200 ms). Moreover, use of FCL 40 in power system 2A allows the implementation of a lower-cost, slower protection device 25.

When FCL 40 is used in conjunction with secondary protection device 25, FCL 40 serves as a buffer for secondary protection device 25. In this respect, FCL 40 is active for a very short period of time (e.g., about 50 ms-200 ms) after the occurrence of a fault condition. Thereafter, secondary protection device 25 is activated to interrupt the circuit between power source 4 and the location of the fault on power line 5, thereby totally removing the fault current. In this embodiment, the high impedance path 42H limits the fault current for a period of time until protection device 25 clears the fault condition.

The use of FCL 40 in combination with secondary protection device 25 allows the size, cost and complexity of secondary protection device 25 to be reduced. Since FCL 40 limits the fault current, a lower current rated secondary protection device 25 is used. For example, high current rated circuit breakers are bulky and expensive. These can be eliminated with proper FCL operation, where FCL 40 holds the current below a threshold current for a time period long enough for the low current rated secondary protection device 25 to clear the fault.

Figure 2B:
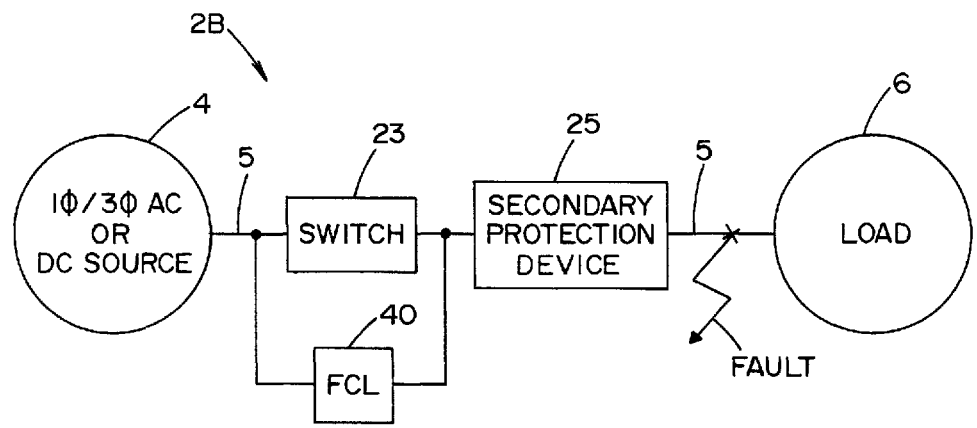
FIG. 2B is a block diagram showing a power system that includes an FCL of the present invention connected in parallel with a fast-acting switch, wherein the FCL and the switch are connected in series with a secondary protection device.

FIG. 2B illustrates a power system 2B in which FCL 40 is used in combination with a secondary protection device 25 (e.g., a conventional fuse or circuit breaker), wherein FCL 40 is arranged in parallel with a switch 23 moveable between an ON (closed) position and an OFF (open) position. Secondary protection device 25 is connected in series with the parallel-connected FCL 40 and switch 23. Switch 23 is preferably a fast-acting switch having a relatively small current rating. In this regard, switch 23 may be a fuse, a circuit breaker, a semiconductor switch, or any other type of fast response protection device that opens quickly. It is noted that fuses have very low impedance when conducting in the normal state, and therefore the power loss of such device is almost negligible in the normal state.

During normal operation, both switch 23 and secondary protection device 25 are closed, thereby conducting normal current. When a fault occurs downstream and the current on power line 5 reaches the predetermined threshold fault current level, switch 23 quickly opens (i.e., turns OFF) to redirect the fault current to FCL 40. FCL 40 limits the fault current until secondary protection device 25 disconnects power source 4 from load 6 within a short time period (e.g., 100-200 ms), thereby clearing the fault. In this embodiment, high impedance path 42H is magnetically coupled across switch 23. When switch 23 opens, the high impedance is automatically inserted into power line 5 line through magnetic coupling circuit 44. Since current flows through FCL 40 only during a fault condition, FCL 40 does not need to include low impedance path 42L. Low impedance path 42L may be effectively removed from FCL 40 by keeping switching unit 65 in the OFF state (open) during both normal and fault conditions.

Figure 2C:
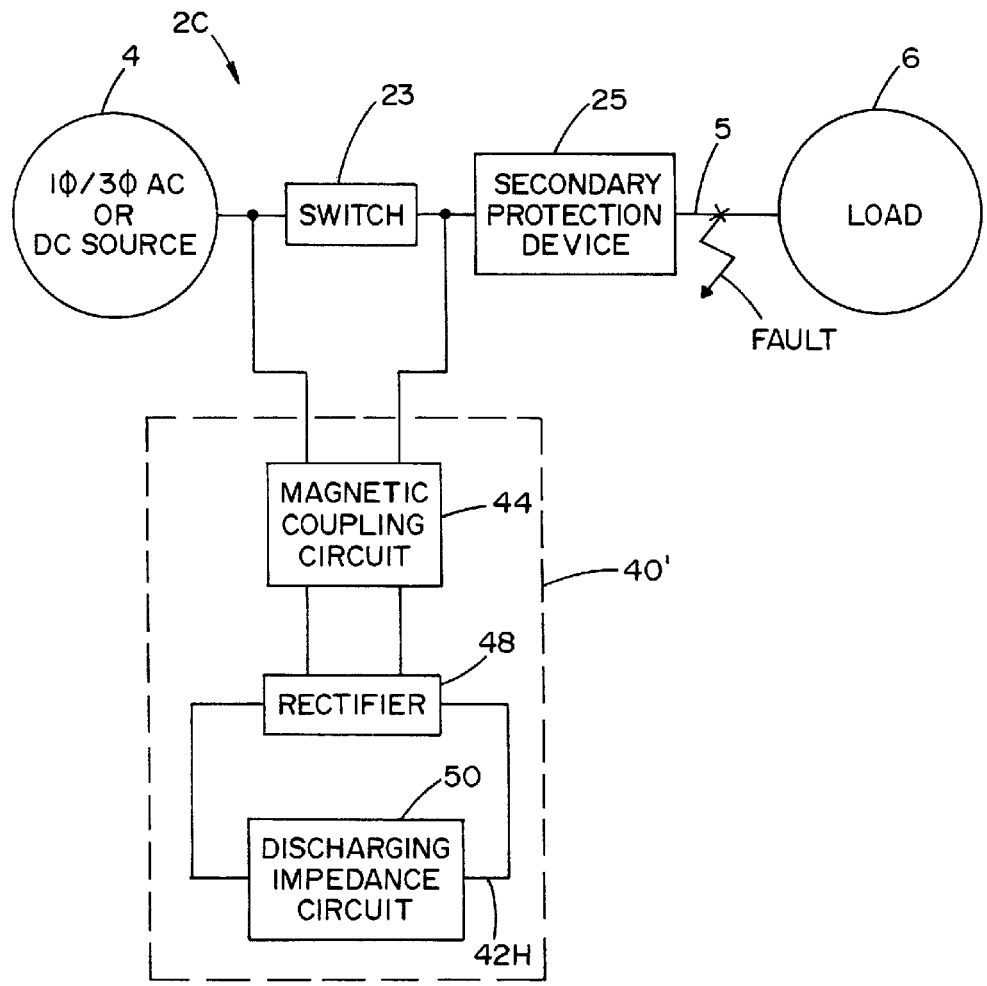
FIG. 2C is a block diagram showing a power system that includes an FCL of the present invention (without a low impedance path) connected in parallel with a fast-acting switch, wherein the FCL and the switch are connected in series with a secondary protection device.

Alternatively, low impedance path 42L may be removed by omitting the components of low impedance path 42L. In this regard, FIG. 2C illustrates a power system 2C having an FCL 40' that omits sensing circuit 60, reactor circuit 62, switching unit 65, DC source V1 and control circuit 70. In the event of a fault, when the fault current reaches the predetermined threshold fault current level, switch 23 opens (i.e., turns OFF) within a very short period of time. As a result, the fault current is redirected to FCL 40'. FCL 40' clamps the fault current using discharging impedance circuit 50 of high impedance path 42H. Secondary protection device 25 disconnects power source 4 from load 6 within a short time period.

Referring now to power system 2B (FIG. 2B) and power system 2C (FIG. 2C), when switch 23 opens (turns OFF), there is a small arc across switch 23, since the energy is being redirected to FCL 40, 40'. In this case, the ratings for switch 23 can be low. Moreover, since secondary protection device 25 interrupts the current at the current level that is limited by FCL 40, 40', the required rating of secondary protection device 25 is also low. As a result, switch 23 and secondary protection device 25 can be low cost and have small volume and size.

Figure 3:
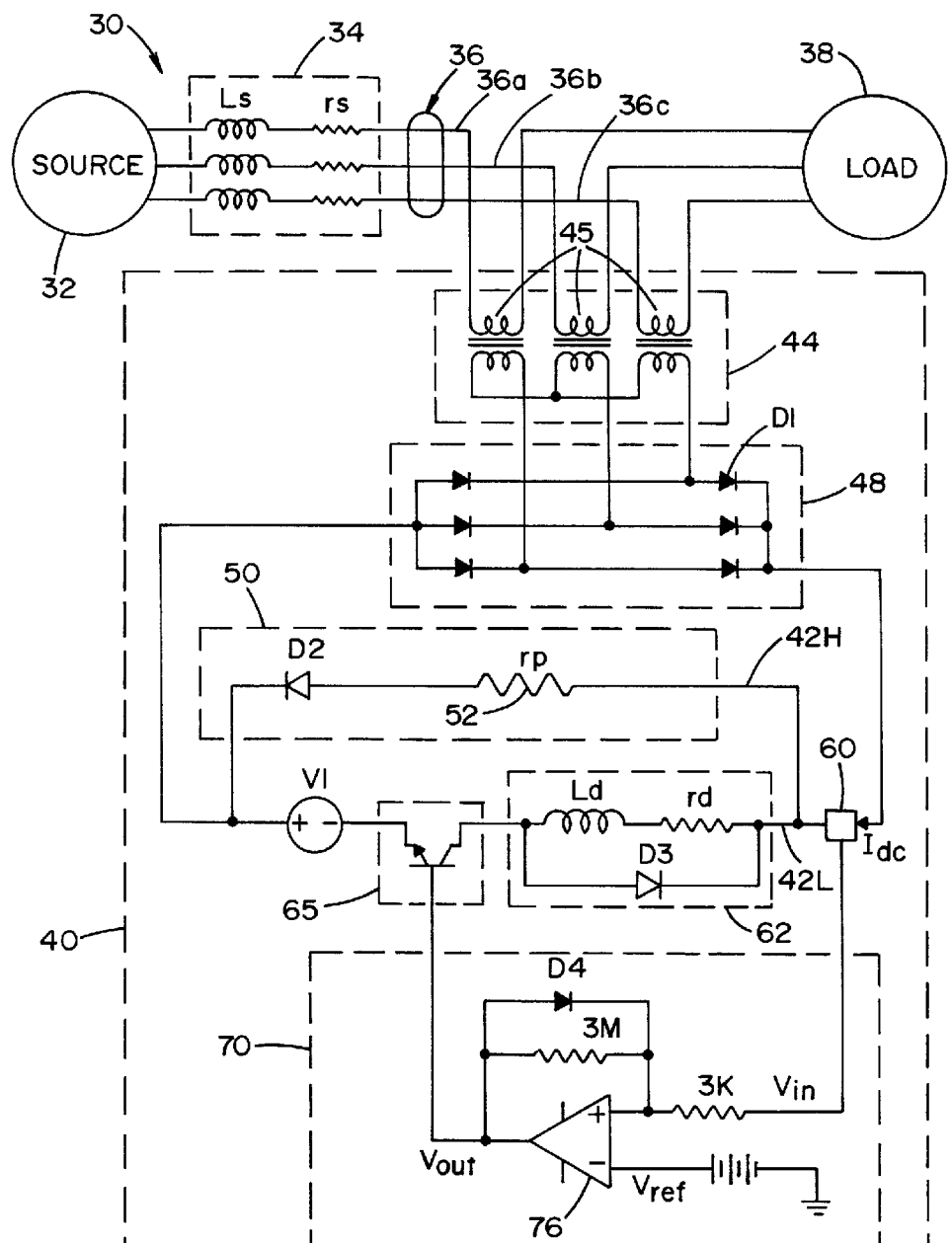
FIG. 3 is a detailed schematic diagram showing a 3-phase power system that includes an FCL according to one embodiment of the present invention.

FIG. 3 shows a three-phase power system 30 that includes a three-phase (AC power) power line 36 (comprised of conductors 36a, 36b and 36c) which electrically connects a three-phase voltage source 32 to a three-phase load 38. Three-phase voltage source 32 has a source impedance 34 represented by inductors Ls and resistors rs on each of the conductors 36a, 36b, 36c. System 30 also includes fault current limiter (FCL) 40 according to an embodiment of the present invention.

In the embodiment illustrated in FIG. 3, FCL 40 is generally comprised of a magnetic coupling circuit 44 that takes the form of an isolation transformer comprised of three (3) single-phase current transformers 45 (or alternatively a single three-phase current transformer); a rectifier 48; a sensing circuit 60; a low impedance path 42L including a reactor circuit 62, a switching unit 65, and a DC source V1 (voltage or current source); a high impedance path 42H including a discharging impedance circuit 50; and a control circuit 70. Low impedance path 42L is connected in parallel with high impedance path 42H.

Magnetic coupling circuit 44 is used to monitor the current in power line 36. In the illustrated embodiment, the AC power line current is mirrored through the three single-phase current transformers 45 (each having a turns ratio of 1:1) to the secondary sides of the current transformers 45 that are electrically connected to rectifier 48.

Rectifier 48 rectifies the AC current mirrored from current transformers 45 into DC current. In the illustrated embodiment, rectifier 48 is comprised of a full-bridge rectifier that includes six rectifier diodes D1. The AC power line current is monitored through magnetic coupling, which is non-intrusive to conductors 36a, 36b, 36c that are being protected.

Sensing circuit 60 senses a DC current and provides an output Vin that is proportional to the sensed current Idc. As indicated above, sensing circuit 60 may take the form of a Hall-effect sensor or a shunt resistor.

In the illustrated embodiment, reactor circuit 62 of low impedance path 42L is comprised of a DC reactor in the form of a reactor inductor coil Ld, a resistor rd, and a freewheeling diode D3. Reactor inductor coil Ld is series-connected with resistor rd. Diode D3 is connected in parallel with reactor inductor coil Ld and resistor rd.

In the embodiment shown in FIG. 3, switching unit 65 of low impedance path 42L takes the form of a semiconductor switch, such as an insulated gate bipolar transistor (IGBT), a MOSFET, or a HET, with an associated driving circuit. In the illustrated embodiment, the semiconductor switch is an IGBT (e.g., Advanced Power Technology APT50GF100BN). However, a MOSFET improves the power loss on switching unit 65 during normal operation. It is contemplated that other types of switches may be used, including other semiconductor switches, as well as mechanical switches.

DC source V1 of low impedance path 42L provides the necessary DC bias during normal operation. The value of DC source V1 is selected such that the normal operation current is maintained.

In the illustrated embodiment, discharging impedance circuit 50 of high impedance path 42H is comprised of a discharging resistor 52 (having a resistance value rp) series-connected with a blocking diode D2 for blocking leakage current. It is also contemplated that discharging resistor 52 may be part of an RLC circuit.

Control circuit 70 as shown in FIG. 3 includes a comparator 76 (e.g., Texas Instruments LM393 voltage comparator) and an associated latch circuit that includes feedback diode D4. Vin from sensing circuit 60 reflects the sensed current level ($I_{dc}$). Comparator 76 compares Vin with Vref which is a predetermined constant value that represents a threshold fault current level. When Vin<Vref, then Vout is in a low state (indicating a normal condition). As a result, switching unit 65 is in the ON state (i.e., closed switch). When Vin>Vref, then the output (Vout) of comparator 76 flips from the low state to a high state (indicating a fault condition), and feedback diode D4 conducts, pulling Vin to a high state. In this case, Vin remains larger than Vref and Vout is "latched" at the high state. Therefore, when Vin>Vref, the resulting Vout causes switching unit 65 to change from the ON state (normal operation) to the OFF state (current limiting), and remain in the OFF state once it is triggered. Switching unit 65 maintains the OFF state regardless of changes to the sensed current level ($I_{dc}$), until control circuit 70 is reset. Upon reset, switching unit 65 is returned to the ON state. This latching scheme helps reduce voltage stress across the semiconductor switch of switching unit 65.

It should be appreciated that while the embodiment illustrated by FIG. 3 shows control circuit 70 comprised of an analog control logic circuit (e.g., a comparator circuit), it is also contemplated that control circuit 70 may take the form of a programmable controller (e.g., a microcontroller unit).

During normal operation, high impedance path 42H is bypassed due to the ON state (closed switch) of switching unit 65. In contrast, during a fault condition switching unit 65 switches from the ON state (closed switch) to the OFF state (open switch) to replace low impedance path 42L with high impedance path 42H, and thereby force fault current to pass through high impedance path 42H. Accordingly, the fault current is limited by discharging impedance circuit 50 (i.e., discharging resistor 52 and blocking diode D2). Discharging resistor 52 dissipates virtually no power unless there is a fault current. The resistance value rp of discharging resistor 52 is selected such that the fault current is clamped at a desire level upon triggering of the switching unit 65 to change switching unit 65 from the ON state (closed switch) to the OFF state (open switch).

When switching unit 65 in low inductance path 42L is switched to the OFF state, current still remains in the DC reactor of reactor circuit 62. Freewheeling diode D3 (which is connected in parallel with the DC reactor) allows this residual current in the DC reactor to continue to flow within a small loop.

As will be explained below, selection of the resistance value rp for discharging resistor 52 leads to two different protection schemes: (i) pulse modulated protection and (ii) latch protection. Pulse modulated protection scheme is described in detail in Hagh et al. The pulse modulated protection scheme provides more flexibility in adjusting the threshold fault current level (i.e., the current level at which FCL 40 is activated to limit the current) with a fixed resistance value rp. In the illustrated embodiment, the threshold fault current level may be customized by the user.

Figure 4A:
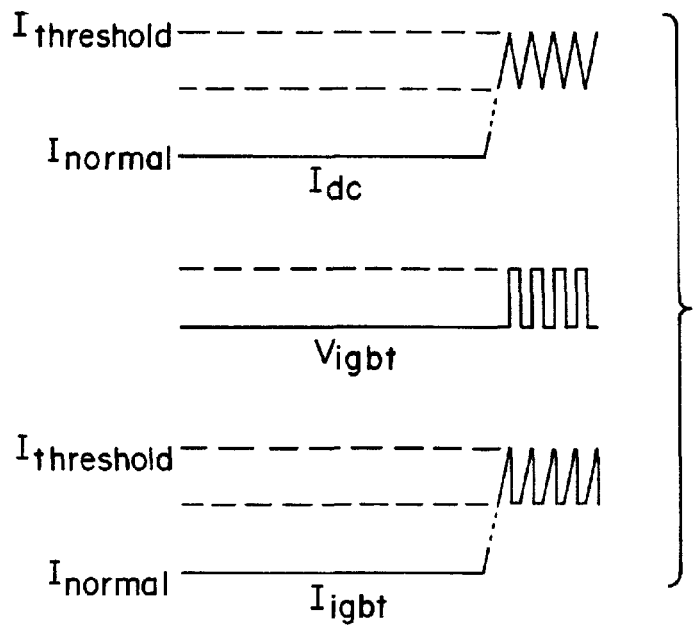
FIG. 4A is an operation waveform of a pulse modulated protection scheme.

Referring now to FIG. 4A, there is shown an operation waveform of a pulse modulated protection scheme, wherein $I_{threshold}$ is the threshold fault current level that triggers the IGBT OFF,
$I_{normal}$ is the current level during normal operation,
$I_{dc}$ is the DC current sensed by sensing circuit 60,
$V_{igbt}$ is the voltage across the semiconductor switch (IGBT), and
$I_{igbt}$ is the current through the semiconductor switch (IGBT).

With a fixed discharging resistor value rp, the pulse modulated protection scheme provides a wide range of adjustable fault current limiting levels by varying the duty ratio of the pulse signal. However, one limitation of the pulse modulated protection scheme is that the voltage stress on the semiconductor switch can get very high depending on the duty ratio. For example, in a three-phase system with a line-to-line voltage (i.e., the voltage measured between conductors 36a, 36b and 36c) of 600V, the peak voltage $V_{igbt}$ across the semiconductor switch would be as high as 4 kV if the fault current is limited at 30 A.

Figure 4B:
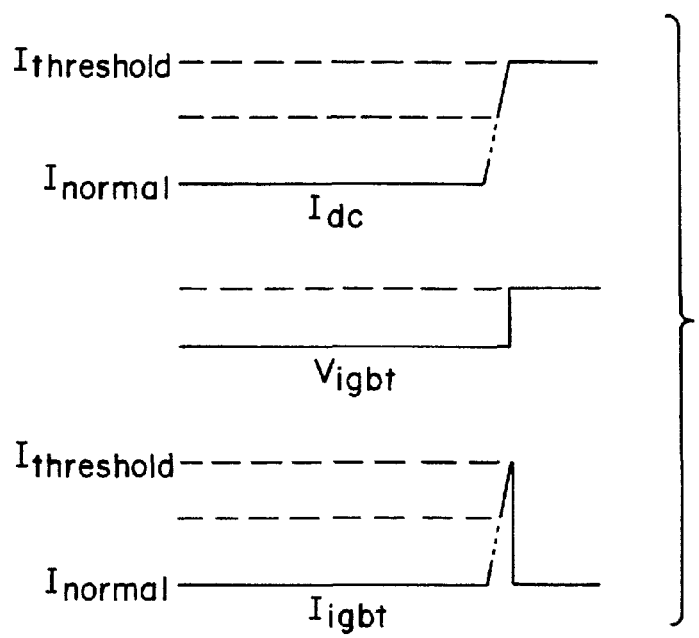
FIG. 4B is an operation waveform of a latch protection scheme.

Referring now to FIG. 4B, there is shown an operation waveform of a latch protection scheme. In the latch protection scheme "latching" occurs after a one-shot action of the semiconductor switch in order to lower the voltage stress of the semiconductor switch. In the latch protection scheme, the discharging resistor value rp is fine tuned such that the fault current is held at a desired level when it is conducted to pass rp continuously.

The latch protection can be modified to a pulse modulated scheme by adding pulse width modulation (PWM) control. In this case, the range of adjustable fault current limiting level is reduced by a smaller discharging resistor value rp.

The present invention will now be further described by way of the following example FCL 40.

EXAMPLE

Example FCL 40 will now be described with reference to FIG. 5 and TABLE 1. TABLE 1 provides a list of major components selected for the sample prototype.

TABLE 1

| Device | Part | Description |
|---|---|---|
| current transformers 45 | CR MAGNETICS 10WP-005 | 1:1 ratio, 40 A, 1.5 lbs. |
| rectifier diodes D1 for rectifier 48 | DIODES Inc. 10A07-T | 1000 V reverse voltage |
| switching unit 65 | FAIRCHILD FSAM20SH60A | 600 V, 20 A 3-phase IGBT inverter bridge with drivers, 40 A IGBT collector current (peak) |
| discharging resistor 52 | Yageo AHA80AJB-15R-ND | 80 W, 15 Ω |
| blocking diode D2 | DIODES Inc. S2AA | 1.5 A surface mount glass passivated rectifier |
| reactor inductor coil Ld | MURATA 1400 Series 1468431C | 680 μH, 3.1 A, quantity = 6 |
| sensing circuit 60 | Honeywell CSLH3A45 | miniature ratiometric linear Hall-effect sensor |

Current transformers 45 have a low stress rating during normal operation (30V, 5 A and 210 W), and are highly stressed during a fault condition (450V, 30 A and 14 kW). Since the fault condition typically lasts for only about 200 ms, current transformers 45 can be reasonably undersized as long as they can handle the peak power in 200 ms or handle the peak power until a current secondary protection device clears the fault. It should be noted that the current transformers 45 identified in TABLE 1 are designed for metering purposes, and therefore weight and cost can be further reduced if transformers 45 are custom made with less accuracy.

Figure 5:
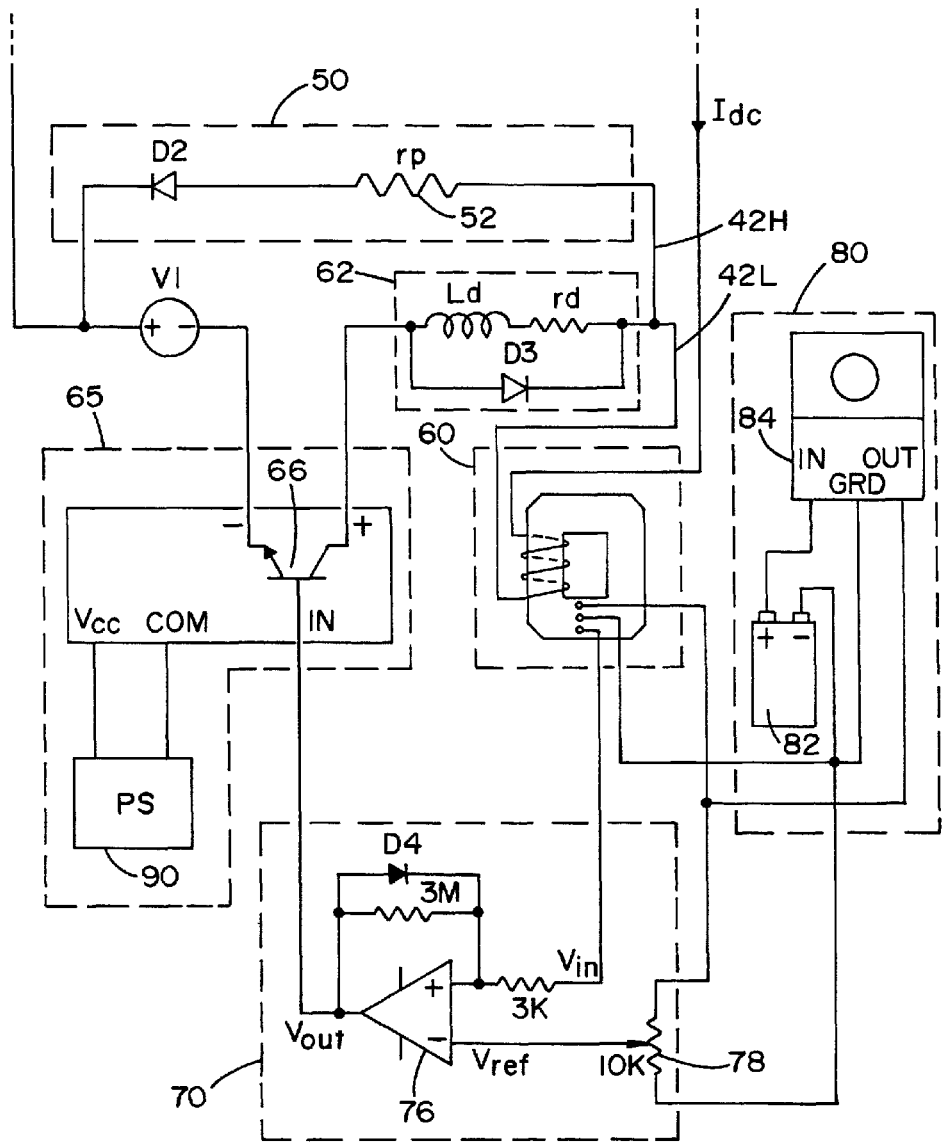
FIG. 5 is a detailed schematic showing a sensing circuit, a switching unit and a control circuit of one embodiment of the FCL of the present invention.

Referring to FIG. 5, there is shown a detailed schematic showing sensing circuit 60, switching unit 65 and control circuit 70 for the example FCL 40. It should be appreciated that the circuit design of FIG. 5 is shown for the purpose of illustrating an embodiment of the present invention, and is not intended to limit same.

The selected switching unit 65 includes a semiconductor switch 66 that takes the form of an IGBT. However, it is contemplated that a MOSFET, JFET, or other suitable switching device can be used instead of an IGBT in order to improve the power loss on switching unit 65 during normal operation. With a MOSFET, impedance is ~0.1 Ohms if two MOSFETs are parallel connected, which is 2.5 W power dissipation when normal operation current is 5 A. The IGBT identified in TABLE 1 normally has a collector-emitter saturation voltage of 2.5V, which dissipates 12.5 W when conducting the 5 A current. Switching unit 65 should be energized before FCL 40 is connected to power line 36, since switching unit 65 conducts continuous operation current during normal operation.

Sensing circuit 60 is shown as a hall-effect current sensing device. Comparator 76 of control circuit 70 may take the form of a Texas Instruments LM393 voltage comparator. It should be appreciated that alternative sensing devices and voltage comparators may be substituted for the illustrated components.

A power supply 80 provides power to sensing circuit 60. In the illustrated embodiment, power supply 80 is comprised of a 9V battery 82, regulated to 5V by a voltage regulator 84. Divided by a potentiometer 78 of 10K, the 9V-battery 82 (regulated to 5V) also provides a reference input voltage (Vref) to the inverse input terminal of comparator 76 of control circuit 70. The DC power provided by the 9V-battery could alternatively be provided by a DC/DC converter, an AC/DC converter or other power supply device.

Switching unit 65 is powered by a power supply 90. In the illustrated embodiment, power supply 90 is a 15V DC power supply. The driver for the IGBT requires a low signal to turn ON the IGBT (closed switch) and a high signal to turn OFF the IGBT (open switch). Feedback diode D4 is provided to carry out latching, as described above.

The fault types identified in a 3-phase system are summarized with reference to FIGS. 6A-6E. There are five different types of typical faults in 3-phase systems. These faults are categorized into two different groups: (i) symmetric faults (3-phase ground fault and 3-phase short circuit) and (ii) asymmetric faults (single phase ground fault, 2-phase ground fault, and 2-phase short circuit). The most common faults are line-to-ground faults. Line-to-line faults account for about 15% of all short-circuit faults, while symmetric 3-phase faults only account for about 5% of all short circuit faults.

Figure 6A:
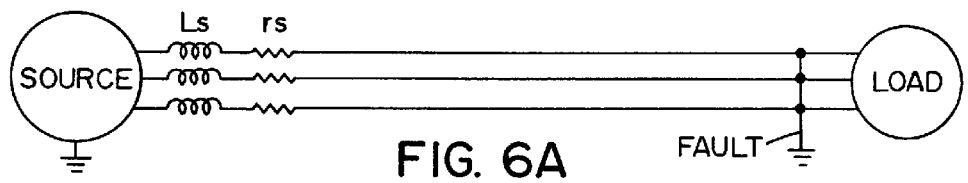
FIG. 6A is a schematic illustration of a 3-phase ground fault, wherein conductors of all three phases are shorted to ground simultaneously.
Figure 6B:
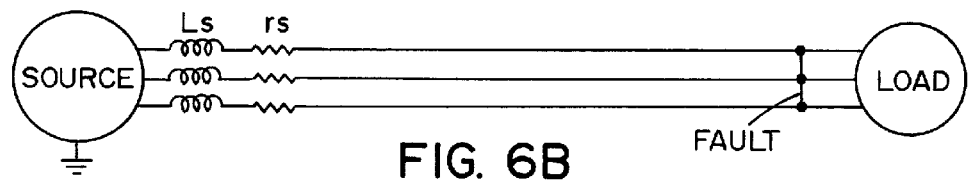
FIG. 6B is a schematic illustration of a 3-phase short circuit, wherein conductors of all three phases are shorted to each other.
Figure 6C:
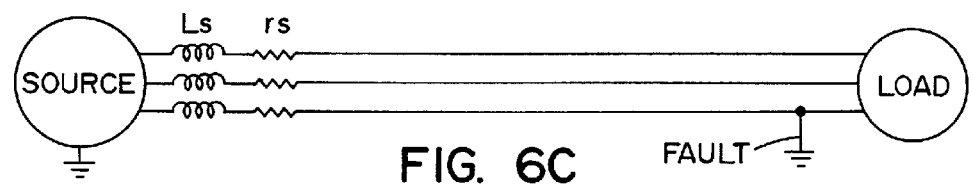
FIG. 6C is a schematic illustration of a single line short circuit, wherein the conductor of only one phase is shorted to ground.
Figure 6D:
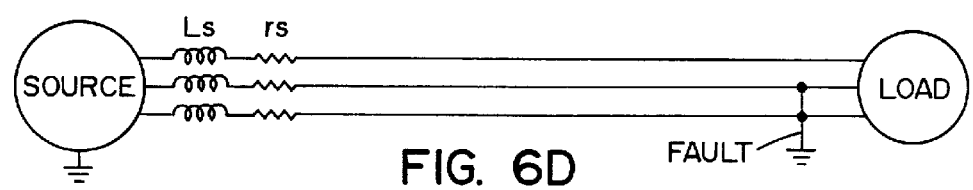
FIG. 6D is a schematic illustration of two line short circuit, wherein conductors of only two phases are shorted to ground, thereby causing over-current and imbalance in the system.
Figure 6E:
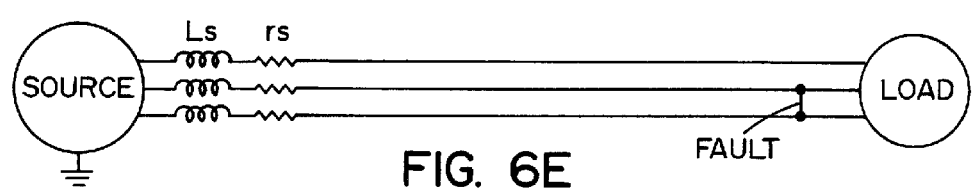
FIG. 6E is a schematic illustration of a two line short circuit, wherein conductors of only two phases are shorted to each other.

FIG. 6A schematically illustrates a 3-phase ground fault, wherein the conductors of all three phases are shorted to ground simultaneously. The fault impedances on all three phases are identical, maintaining the balance among the three phases. During this type of fault, the load impedance drops to virtually zero, causing large fault currents on all three phases running into ground. FIG. 6B schematically illustrates a 3-phase short circuit, wherein the conductors of all three phases are shorted to each other. FIG. 6C schematically illustrates a single line shorted to ground, wherein a conductor of only one phase is shorted to ground. Simulations show that in case of this type of fault, the fault current would not be as large as in the 3-phase faults mentioned above, FIG. 6D schematically illustrates two lines shorted to ground, wherein conductors of only two phases are shorted to ground, thereby causing over-current and unbalance in the system. FIG. 6E schematically illustrates a two line short circuit, wherein conductors of only two phases are shorted to each other. Simulations show that the behavior and response of FCL 40 in the case of a 2-phase short circuit (shorted to each other) is virtually identical to those in the case of a 2-phase ground fault.

The present invention provides a FCL 40 that limits the fault current in a power system 30 during a fault condition. When the fault current exceeds a predetermined threshold fault current level, FCL 40 is triggered thereby limiting the fault current under a desired level. FCL 40 limits the fault current during a fault condition, while inserting only a negligible impedance to power line 36 during normal conditions. In one embodiment of the present invention, FCL 40 uses a magnetic coupling circuit 44 to couple the AC current on power line 36 to the secondary side, and rectifies this AC current to a DC current that is let through by a normally-closed semiconductor switch 66 during normal conditions. Since the AC and DC currents are coupled with each other, the primary side AC current can therefore be controlled by controlling the DC current on the secondary side. In the event of a short circuit fault on the power line and the primary side AC current reaching the predetermined threshold fault current level, an impedance is inserted into the DC side to control the DC current, and consequently, to limit the AC current to the desired level. This process occurs quickly (i.e., microseconds), thereby preventing the presence of a large overshoot current that is potentially hazardous to the secondary protection devices and downstream equipment.

Unlike existing FCLs, FCL 40 uses magnetic coupling to monitor and control an AC current on the primary side of the power line. This non-intrusive approach advantageously has small power dissipation (and equivalently, the inserted impedance) during normal operation. Moreover, during a fault condition, a large impedance is inserted in the power line (through magnetic coupling) to limit fault current quickly (i.e., in microseconds), thereby preventing a large overshoot of fault current that can damage other equipment in the power system.

It should be appreciated that several modifications to FCL 40 are contemplated. For example, size and weight can be further reduced for commercialized products. Furthermore, as noted above, two different schemes of current limiting may be implemented in accordance with the present invention. These schemes are (i) pulse width modulated protection, which provides a self-recoverable feature of FCL 40 and a wider range of adjusting for the threshold fault current level, and (ii) latch protection, which only requires a "reset" action after every triggering, while it effectively lowers the voltage stress of the semiconductor switch, thereby lowering the cost and size of FCL 40. It is contemplated that FCL 40 can be either self-resettable or can be manually reset by pushing a button or via remote control.

As indicated above, it is contemplated that the FCL of the present invention may be used in combination with secondary protection devices (e.g., conventional circuit breaker, protection relays, and/or fuses) to clear a fault. When used with secondary protection devices, the FCL of the present invention reacts faster than the secondary protection devices trigger, thereby permitting the use of secondary protection devices having lower response speed and current rating.

Conventional secondary protection devices typically have delays in protecting against over-current conditions. FCL 40, for example, can respond to the fault current fast, and limit the fault current for the secondary protection devices to prevent damage. In turn, the secondary protection devices can clear the fault current and terminate current flow on the power line in a short time, thereby reducing the high energy stress on components of the FCL. Since the fault clearing time is very short, the size and cost of FCL 40 can be reduced because current transformers 45 and discharging resistor 52 can be smaller.

As indicated above, the present invention provides several advantages with respect to compactness, reduced weight, simplicity, reliability and low normal operation loss. In this respect, since the components are rated for limiting a large fault current for a few hundred milliseconds, the components can be small and lightweight, as compared to components rated to run the fault current in steady state. Furthermore, most of the components of the FCL of the present invention are passive elements, and thus control elements only need to be activated when the fault current reaches the threshold fault current level. Both the configuration and operation of the FCL are simple and therefore the FCL provides enhanced reliability.

Since switching unit 65 of FCL 40 only switches when there is a fault current, there is no switching loss during normal operation. The total losses in normal condition are the voltage drop of solid state elements, and the losses within current transformers 45. Since the efficiency of current transformers 45 can be very high, and the voltage drop on semiconductor switch 66 is low, the total loss during normal operation of FCL 40 is low. In addition, the FCL 40 does not require action or maintenance after triggered by a fault. As long as the AC line current on the primary side of current transformers 45 is below the threshold fault current level, semiconductor switch 66 is set to the ON state (closed switch) and FCL 40 is operating under normal operation mode. The protection process could be self-recoverable and repeatable without human service.

In the FCL of the present invention, the fault current may be allowed to increase quickly, and in some cases temporarily above the clamped threshold current level, before switching unit 65 is changed to the OFF state (open switch). In this respect, switch action in IGBTs and MOSFETs are so fast (often on the order of microseconds), that it is not always necessary to clamp the peak fault current in the first short transient time periods. Since the DC reactor of reactor circuit 62 does not need to limit the rate of faulted current change and does not need to carry the faulted current, its size, weight and inductance value can be substantially reduced.

It is further contemplated that the FCL of the present invention may be modified to remove DC reactor circuit 62 from low impedance path 42L if control circuit 70 can change switching unit 65 to the OFF state (open switch) quickly enough and the current ripple is not too large.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

Having described the invention, the following is claimed:

1. A fault current limiter (FCL) for limiting a fault current in a power line during a fault condition, said FCL comprising:
    a magnetic coupling circuit for monitoring current in the power line through magnetic coupling;
    a sensing circuit for sensing the current in the power line and providing a signal indicative of the sensed current;
    a control circuit receiving the signal indicative of the sensed current in the power line and determining whether the sensed current indicates that the fault condition exists;
    a high impedance path including:
        a discharging impedance circuit for limiting the fault current, said discharging impedance circuit injecting a discharging impedance into the main power line through magnetic coupling during the fault condition; and
    a low impedance path connected in parallel with the high impedance path, said low impedance path including:
        a reactor circuit; and
        a switching unit having an ON state and an OFF state, wherein the state of the switching unit determines whether current conducts through the low impedance path or the high impedance path, said control circuit determining the state of the switching unit.

2. A FCL according to claim 1, wherein said control circuit determines whether the sensed current indicates that the fault condition exists by determining if the sensed current exceeds a threshold fault current level indicative of the fault condition.

3. A FCL according to claim 1, wherein said control unit switches the switching unit from the ON state to the OFF state in response to determining that the fault condition exists, thereby redirecting said fault current from the low impedance path to the high impedance path.

4. A FCL according to claim 1, wherein said reactor circuit includes a DC reactor.

5. A FCL according to claim 4, wherein said reactor circuit further includes a freewheeling diode in parallel with said DC reactor.

6. A FCL according to claim 1, wherein said reactor circuit is connected in series with said switching unit.

7. A FCL according to claim 6, wherein said low impedance path further includes a DC source connected in series with the reactor circuit and the switching unit, to provide a DC bias during normal operation.

8. A FCL according to claim 1, wherein said discharging impedance circuit includes a discharging resistor or an RLC circuit.

9. A FCL according to claim 8, wherein said discharging impedance circuit further includes a blocking diode connected in series with said discharging resistor.

10. A FCL according to claim 1, wherein said switching unit comprises a semiconductor switch or a mechanical switch.

11. A FCL according to claim 10, wherein said semiconductor switch is one of the following: an IGBT, a MOSFET or a JFET.

12. A FCL according to claim 1, wherein said control circuit includes a programmable controller.

13. A FCL according to claim 1, wherein said control circuit includes a comparator.

14. A FCL according to claim 13, wherein said control circuit further includes a feedback diode.

15. A FCL according to claim 1, wherein said power line is connected with a DC power source.

16. A FCL according to claim 1, wherein said power line is connected with an AC power source.

17. A FCL according to claim 1, wherein said magnetic coupling circuit comprises at least one current transformer.

18. A FCL according to claim 1, wherein said sensing circuit includes one of the following: a hall-effect current sensing device or a shunt resistor.

19. A power system comprising:
    a power line that electrically connects a power source to a toad;
    a protection device for interrupting a circuit to clear a fault condition; and a fault current limiter (FCL) for limiting a fault current in the power line during a fault condition, said FCL comprising:
        a magnetic coupling circuit for monitoring current in the power line through magnetic coupling;
        a sensing circuit for sensing the current in the power line and providing a signal indicative of the sensed current;
        a control circuit receiving the signal indicative of the sensed current in the power line and determining whether the sensed current indicates that the fault condition exists; and
        a high impedance path including:
        a discharging impedance circuit for limiting a fault current during a fault condition, said discharging impedance circuit injecting a discharging impedance into the main power line through magnetic coupling during the fault condition,
        a low impedance path in parallel with the high impedance path, said low impedance path including:

a reactor circuit; and a switching unit having an ON state and an OFF state, wherein the state of the switching unit determines whether current conducts through the low impedance path or the high impedance path, said control circuit determining the state of the switching unit.

20. A power system according to claim 19, wherein said protection device includes one of the following: a fuse, a circuit breaker, or a protective relay.

21. A power system according to claim 19, wherein said high impedance path limits the fault current for a period of time until said protection device clears the fault condition.

22. A power system according to claim 19, wherein said control circuit determines whether the sensed current indicates that the fault condition exists by determining if the sensed current exceeds a threshold fault current level indicative of the fault condition.

23. A power system according to claim 19, wherein said FCL further comprises:

a rectifier for converting AC current on the power line to DC current.

24. A method for limiting a fault current in a power line, comprising:

monitoring current in the power line through magnetic coupling;

sensing the current in the power line;

determining whether the sensed current indicates that a fault condition exists; snf if the fault condition is determined to exist, then redirecting current from a low impedance path to a high impedance path that is connected in parallel with the low impedance path, if the fault condition is determined to exist, thereby limiting the fault current in the power line during the fault condition, wherein the high impedance path includes a discharging impedance circuit for limiting the fault current, said discharging impedance circuit injecting a discharging impedance into the main power line through magnetic coupling during the fault condition, and the low impedance path includes a reactor circuit and a switching unit having an ON state and an OFF state, wherein the state of the switching unit determines whether current conducts through the low impedance path or the high impedance path, said control circuit determining the state of the switching unit.

25. A method according to claim 24, wherein said step of determining whether a fault condition exists includes:

determining whether the current sensed in the power line exceeds a predetermined threshold fault current level.

26. A method according to claim 24, wherein said method further comprises:

activating a switching unit in response to determining that the fault condition exists, wherein activation of the switching unit redirects the current to the high impedance path.

* * * * *